(12) United States Patent
Takahashi et al.

(10) Patent No.: US 8,880,753 B2
(45) Date of Patent: Nov. 4, 2014

(54) VEHICLE ELECTRONIC CONTROLLER FOR AUTOMATICALLY SWITCHING BETWEEN A PORT BEING SUSPENDED BASED ON A MODE OF AN INTERNAL OSCILLATION CIRCUIT

(71) Applicant: Sumitomo Wiring Systems, Ltd., Mie (JP)

(72) Inventors: Hiroaki Takahashi, Yokkaichi (JP); Takaki Kishida, Yokkaichi (JP); Tomohide Hayashi, Yokkaichi (JP); Tomoya Hayashi, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 13/972,385

(22) Filed: Aug. 21, 2013

(65) Prior Publication Data

US 2014/0082326 A1 Mar. 20, 2014

(30) Foreign Application Priority Data

Sep. 14, 2012 (JP) ................................. 2012-202853

(51) Int. Cl.
*G06F 15/76* (2006.01)
*G06F 3/00* (2006.01)
(52) U.S. Cl.
USPC ................... 710/14; 710/15; 710/16; 710/17; 710/18; 710/19; 712/32

(58) Field of Classification Search
None
See application file for complete search history.

(56) References Cited

U.S. PATENT DOCUMENTS

| 5,485,625 | A | * | 1/1996 | Gumkowski | 713/323 |
| 5,999,876 | A | * | 12/1999 | Irons et al. | 701/115 |
| 7,536,570 | B2 | * | 5/2009 | Leung et al. | 713/300 |

FOREIGN PATENT DOCUMENTS

JP A-2002-127848 5/2002

* cited by examiner

*Primary Examiner* — Tammara Peyton
(74) *Attorney, Agent, or Firm* — Oliff PLC

(57) ABSTRACT

Some embodiments relate to a vehicle electronic controller having a microcomputer and a port expansion element, with reduced power consumption and radio noise. An MCU (microcomputer) performs determination processing that determines whether an output condition is established that is based on a signal that is input via a signal input port of the MCU. If the output condition is established, the MCU transmits a signal output instruction to a port expansion element via a communication port, and if not, the instruction is not transmitted. The port expansion element outputs a signal via a signal output port in response to an instruction from the MCU. The port expansion element automatically switches, depending on whether communication via the MCU is being suspended, between operation in a waiting mode in which the internal oscillation circuit is suspended, and operation in a normal mode in which the internal oscillation circuit is operated.

4 Claims, 2 Drawing Sheets

VEHICLE ELECTRONIC CONTROLLER FOR AUTOMATICALLY SWITCHING BETWEEN A PORT BEING SUSPENDED BASED ON A MODE OF AN INTERNAL OSCILLATION CIRCUIT

BACKGROUND

Some embodiments relate to a vehicle electronic controller provided with a microcomputer, and a port expansion element that provides a plurality of signal inputs in response to an instruction that is transmitted from the microcomputer.

Some related art vehicles, such as automobiles, are provided with electronic controllers that perform various controls, such as traveling system control, power system control, onboard network system control, etc. These electronic controllers are generally referred to as ECU's (Electric Control Units).

In a vehicle's ECU, a microcomputer outputs a control signal of an onboard device through an input/output port, based on a signal showing a state of the vehicle that is input through the input/output port.

For example, Japanese Published Patent Application 2002-127848 discloses an ECU provided with a port expansion element that performs a plurality of signal outputs in response to an instruction from a microcomputer. In this case, a microcomputer can input or output a plurality of signals through one communication port.

By using a port expansion element, the number of input/output signals needed for control processing can be easily changed without changing a main structure of an ECU that utilizes a microcomputer for executing control programs.

In accordance with a related art ECU for a vehicle with a port expansion element, a microcomputer communicates with the port expansion element in a predetermined cycle, a signal showing a vehicle state is input, and a control signal is output.

SUMMARY

Another related art distributed port expansion element is provided with a power-saving function that automatically switches an operation mode from a normal mode to a waiting mode, and vice versa, according to a state of communication with a microcomputer that is a host element.

When a state of communication with a microcomputer satisfies a predetermined suspension condition, the port expansion element with a power-saving function operates in a waiting mode that suspends an internal oscillation circuit needed for communications, etc. In addition, it operates in a normal mode that causes the internal oscillation circuit to operate. An example of a suspension condition is a state of no communication with a microcomputer that continues for a predetermined time or longer.

However, in accordance with a related art vehicle ECU, in order for a microcomputer to communicate with a port expansion element in a predetermined cycle, the port expansion element continues to be operated in a normal mode. In this case, a power-saving effect of the port expansion element cannot be obtained. In addition, the internal oscillation circuit of the port expansion element continues, and there is a problem that radio noise may occur.

It may therefore be beneficial to reduce power consumption and radio noise in a vehicle electronic controller having a microcomputer and a port expansion element.

A vehicle electronic controller in accordance with a first aspect includes a microcomputer and a port expansion element. The microcomputer has a signal input port and a first communication port. The microcomputer performs determination processing that determines whether an output condition is established that is based on a direct input signal that is input via the signal input port. Additionally, when the output condition is established in the determination processing, the microcomputer performs output instruction processing, which transmits a signal output instruction to the port expansion element via the first communication port. When the output condition is not established in the determination processing, the microcomputer does not perform the output instruction processing. Meanwhile, the port expansion element is provided with: (i) a second communication port electrically connected to the communication port of the microcomputer, (ii) a plurality of signal output ports that output a signal that corresponds to an instruction from the microcomputer, and (iii) an internal oscillation circuit. Additionally, depending on whether communication via the second communication port is being suspended, the port expansion element automatically switches between: (i) operation in a waiting mode in which the internal oscillation circuit is suspended, and (ii) operation in a normal mode in which the internal oscillation circuit is operated.

A vehicle electronic controller of a second aspect operates such that, after the output instruction processing is performed, the microcomputer performs state demand processing and comparison processing. The state demand processing is processing that transmits to the port expansion element, via the first communication port, an instruction that demands information of a state of an output signal, and receives a response. The comparison processing is processing that compares a content of an instruction of a signal output by the output instruction processing with a state of an output signal obtained by the state demand processing. Additionally, the microcomputer again performs the output instruction processing when the content of the instruction does not match the state of the output signal in the comparison processing.

In a vehicle electronic controller related to each of the above-mentioned aspects, a microcomputer transmits to a port expansion element an instruction to output a signal if an output condition is established based on a direct input signal that is input via a signal input port of the microcomputer. If not, that instruction is not transmitted. Because of this, a port expansion element transitions to a waiting mode in which an internal oscillation circuit is suspended if a state in which an output condition is not established continues for a certain period of time.

Thus, if a vehicle electronic controller related to each of the above-mentioned aspects is used, a power-saving function of the port expansion element is effectively used, power consumption can be reduced, and radio noise that is generated from the internal oscillation circuit of the port expansion element can be reduced.

An error may occur in which a content of an instruction in a signal output to the port expansion element does not match a state of a signal that has been actually output from the port expansion element. In a related art vehicle electronic controller, a signal output is repeated in a relatively short cycle. Because of this, even if there is an error at the time of one signal output, the error is corrected in a very short period of time by the following signal output.

However, if the following signal is not output until a predetermined output condition is established, if there is an error at the time of a particular signal output, then there may be a case that that the error state may continue for a long period of time. Thus, in the vehicle electronic controller related to the above-mentioned second mode, the microcomputer compares the instruction content with the state of the signal that has been output from the port expansion element when the signal output instruction is transmitted. If they do not match each other, the instruction is re-transmitted to the port expansion element.

DETAILED DESCRIPTION OF THE EMBODIMENTS

The following provides a description that is directed to various exemplary aspects of the invention in the context of the drawings. This description is merely provided as exemplary and is not intended to limit the scope of the invention.

Figure 1:
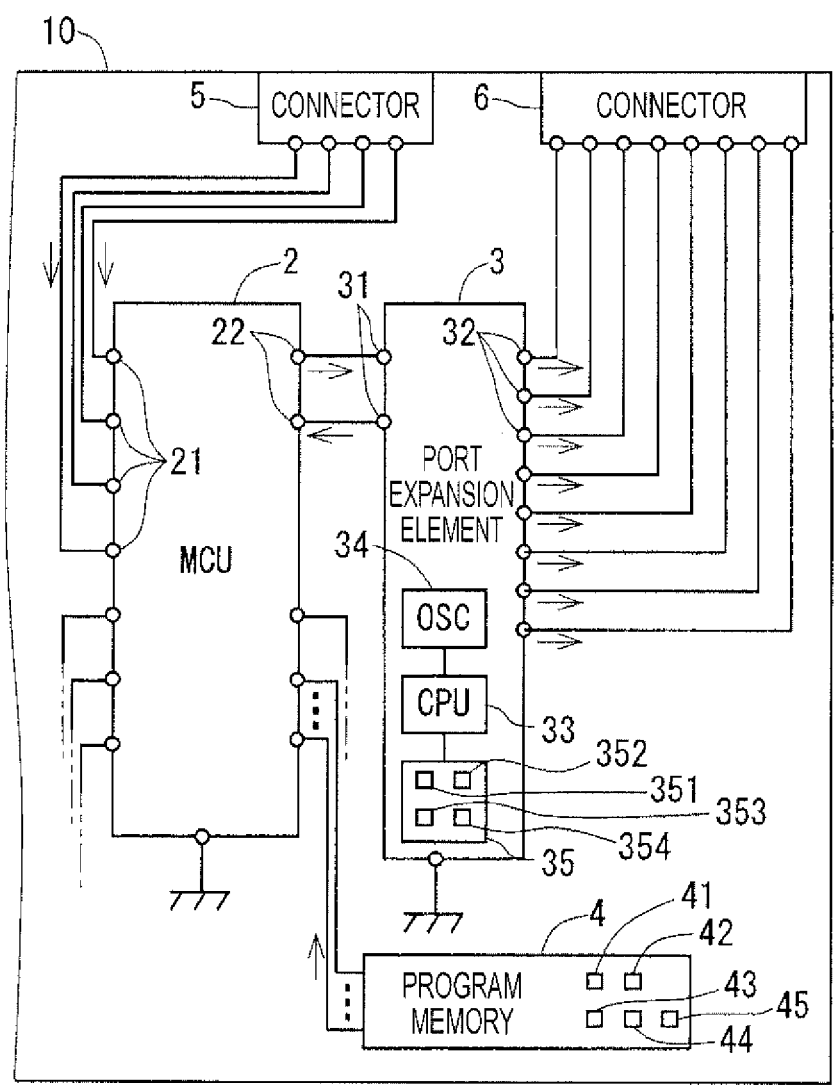
FIG. 1 is a schematic of a vehicle electronic controller (ECU 1) in accordance with an exemplary embodiment.

FIG. 1 shows a structure of an ECU 1, which is an exemplary vehicle electronic controller in accordance with an aspect of this invention. As shown in FIG. 1, the ECU 1 is provided with an MCU (Micro Computer Unit) 2 including a CPU (Central Processing Unit) 33, a port expansion element 3, a program memory 4, a first connector 5, and a second connector 6. These elements are mounted to a circuit board 10.

The MCU 2 is a microcomputer that controls an onboard device (not shown) by executing a predetermined program. The MCU 2 is provided with a plurality of signal input ports 21 and a plurality of serial communication ports 22.

The signal input ports 21 are ports into which a detection signal of a state detector, such as a switch or a sensor that detects a vehicle state, is input. The signal input ports 21 can also be used as signal output ports for the output of signals. However, in this embodiment, they are used for the input of signals. Hereafter, the signals that are input to the MCU 2 via the signal input ports 21 are referred to as direct input signals. Additionally, the signal input ports 21 are one example of first communication ports.

The serial communication ports 22 are connected to a port expansion element 3 via communication lines and are interfaces that control communications with the port expansion element 3. The MCU 2 transmits signal output instructions to the port expansion element 3 via the serial communication ports 22. More specifically, the MCU 2 executes signal input processing, control output condition determination processing, output instruction processing, output state demand processing, and output comparison processing by executing programs that have been recorded to a program memory 4 in advance.

The signal input processing inputs the direct input signals to the MCU 2 via the signal input ports 21.

The control output condition determination processing determines whether a predetermined control output condition is established, based on the direct input signals that are input via the signal input ports 21.

The output instruction processing transmits a signal output instruction to the port expansion element 3 via the serial communication ports 22. The output instruction processing is executed when it is determined that the control output condition is established in the control output condition determination processing. The output instruction processing is not executed when it is determined that the control output condition is not established in the control output condition determination processing.

After the output instruction processing is performed, the output state demand processing transmits to the port expansion element 3, via the serial communication ports 22, a state demand instruction that demands information of the state of the output signal, and receives from the port expansion element 3 a response to the state demand instruction. As described below, the port expansion element 3 is provided with a function that, according to instructions received from the MCU 2, replies by indicating a state of a plurality of signals that are actually being output at that time.

The output comparison processing performs a comparison to determine whether the content of the instruction of the signal output by the output instruction processing matches the state of the output signal in the port expansion element 3 that has been obtained by the output state demand processing.

The program memory 4 is a non-volatile memory to which programs executed by the MCU 2 are recorded. For example, ROM or a flash memory can be used as the program memory 4.

Programs recorded to the program memory 4 include a plurality of program modules, for example, a signal input program 41 that performs signal input processing, a control output condition determination program 42 that performs control output condition determination processing, an output instruction program 43 that performs output instruction processing, an output state demand program 44 that performs output state demand processing, an output comparison program 45 that performs output comparison processing, and the like. Examples of specific processing of the MCU 2 based on these program modules is described below.

The port expansion element 3 receives instructions from the MCU 2 via the communication lines, and outputs a plurality of signals in response to the instructions. As shown in FIG. 1, the port expansion element 3 is provided with serial communication ports 31, a plurality of signal output ports 32, a CPU (Central Processing Unit) 33, an internal oscillation circuit 34, a program memory 35, and the like.

The serial communication ports 31 are electrically connected to the serial communication ports 22 of the MCU 2 via the communication lines, and are interfaces that control communications with the MCU 2. The port expansion element 3 receives signal output instructions from the MCU 2 via the serial communication ports 31. Additionally, the serial communication ports 31 are one example of second communication ports.

The signal output ports 32 output control signals to an onboard device. The signal output ports 32 can also be used as signal input ports into which signals are input. However, in this embodiment, they are used to output signals. Hereafter, signals that are output to an onboard device (not shown) via the signal output ports 32 are referred to as control output signals.

The CPU 33 executes processing that outputs control output signals via the signal output ports 32 in response to instructions from the MCU 2 that are received via the serial communication ports 31. The CPU 33 also executes processing that, according to a state of communication via the serial communication ports 31, shifts an operation mode of the port expansion element 3 to either: (i) a normal mode, or (ii) a waiting mode whose electric consumption is smaller than that of the normal mode.

More specifically, the CPU 33 executes instruction receiving processing, instruction responding processing, waiting mode shift processing, and normal mode return processing by executing programs that have been recorded to the program memory 35 in advance.

The instruction receiving processing receives an instruction from the MCU 2 via the serial communication ports 31. Additionally, the instruction responding processing is executed in response to the instruction received from the MCU 2. The instruction responding processing includes at least control signal output processing. When signal output instructions are received, the control signal output processing outputs control output signals in response to the instructions via the signal output ports 32.

In this embodiment, when state demand instructions are received, the instruction responding processing also includes state responding processing that transmits, via the serial communication ports 31, signal state information showing the state of the control output signals that are being output via the signal output ports 32 at that time. The signal state information shows whether each of the plurality of control output signals is on or off.

The waiting mode shift processing determines whether a state of communication via the serial communication ports 31 satisfies a predetermined suspension condition. If it is determined that the suspension condition is satisfied, the operation mode of the port expansion element 3 is shifted from the normal mode to the waiting mode. The suspension condition is, for example, a condition in which a state of no communication with the MCU 2 has continued for a predetermined time or more. The CPU 33 suspends the operation of the internal oscillation circuit 34 when the operation mode is shifted from the normal mode to the waiting mode.

Meanwhile, the normal mode return processing operates such that, when communication via the serial communication ports 31 begins during the operation in the waiting mode, the operation mode of the port expansion element 3 shifts from the waiting mode to the normal mode, or the operation mode is maintained in the normal mode as-is. The CPU 33 activates the internal oscillation circuit 34 when the operation mode is shifted from the waiting mode to the normal mode.

As shown above, by executing the waiting mode shift processing and the normal mode return processing, depending on whether communication via the serial communication ports 31 is being suspended, the CPU 33 automatically switches between: (i) operation in a waiting mode in which the internal oscillation circuit 34 is suspended, and (ii) operation in a normal mode in which the internal oscillation circuit 34 is operated.

The internal oscillation circuit 34 generates a clock signal needed for processing of serial communication in the port expansion element 3, and other processing.

The program memory 35 is a non-volatile memory to which programs executed by the CPU 33 are recorded. For example, ROM, a flash memory, or the like, can be used as the program memory 35.

Programs recorded to the program memory 35 include a plurality of program modules, for example, an instruction receiving program 351 that performs instruction receiving processing, an instruction responding program 352 that performs instruction responding processing, a waiting mode shift program 353 that performs waiting mode shift processing, a normal mode return program 354 that performs normal mode return processing, and the like. Examples of specific processing of the CPU 33 based on these program modules are described below.

The first connector 5 relays a plurality of input signal lines that transmit each of the plurality of direct inpu t signals.

Meanwhile, the second connector 6 relays a plurality of output signal lines that transmit output signals of the port expansion element 3.

Figure 2:
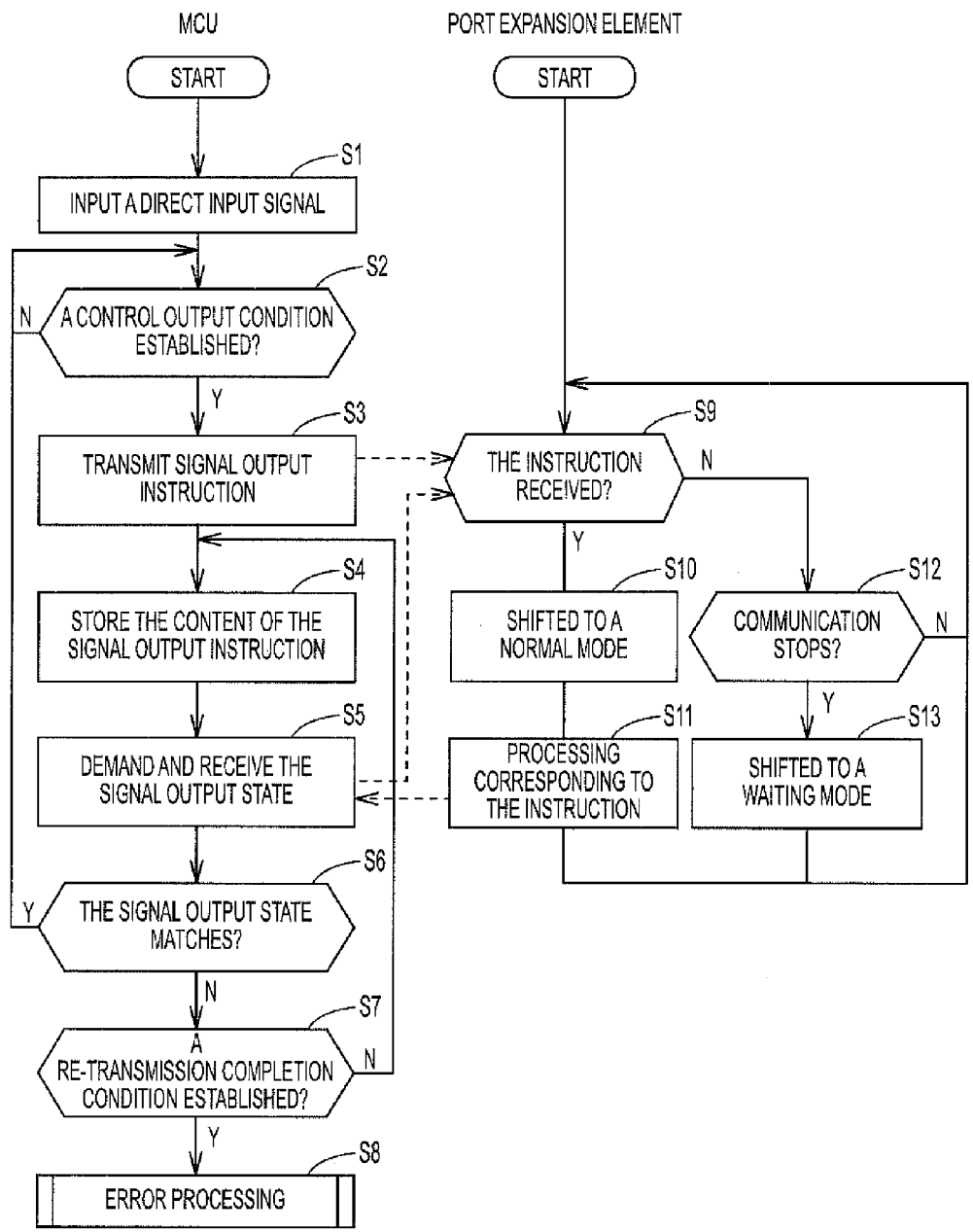
FIG. 2 is a flowchart of a procedure of signal output processing executed by the ECU 1 in accordance with an exemplary embodiment.

An example of a procedure of control signal output processing executed by the MCU 2 and the CPU 33 of the port expansion element 3 is explained with reference to the flowchart of FIG. 2. In FIG. 2, S1-S13 are identification symbols of the processing procedure. The MCU 2 and the CPU 33 of the port expansion element 3 begin the processing shown in FIG. 2, for example, when a power supply to the ECU 1 begins by, for example, an operation of an ignition switch of a vehicle.

Processing on the MCU 2 side of the control output processing is discussed below. First, the MCU 2 regularly inputs a plurality of direct input signals via the signal input ports 21 (S1). The MCU 2 executes the processing of step Si by executing the signal input program 41.

Next, the MCU 2 determines whether a state of each of the plurality of direct input signals that have been input in step S1 is a state in which a predetermined control output condition is satisfied (S2). Each of a plurality of control output conditions is set for a respective one of the combinations that the states of each of the plurality of control output signals may take. For example, the states of each of the direct input signals in a control output condition include: (i) a static state that means whether each of direct input signals is on or off, and (ii) a dynamic state that means that there is a change to the static state at the time of the current input from a static state at the time of the previous input.

When it is determined that all conditions of the plurality of control output conditions are not established, the MCU 2 shifts the processing to the previously described step S1. Meanwhile, when it is determined that at least one control output condition is established, the MCU 2 shifts the processing to the following step S3. The MCU 2 executes the processing of step S2 by executing the control output condition determination program 42.

When a control output condition is established, the MCU 2 transmits a signal output instruction to the port expansion element 3 via the serial communication ports 22, such that the state of the plurality of control output signals becomes a state that corresponds to the established control output condition (S3). The MCU 2 executes the processing of step S3 by executing the output instruction program 43, which involves: (i) combinations of states that each of a plurality of control output signals may take, and (ii) respective ones of a plurality of control output conditions are correlated to each other in advance.

Additionally, the MCU 2 stores in a memory the state of the plurality of control output signals corresponding to the most updated signal output instruction that has been transmitted in step S3. The MCU 2 executes the processing of steps S3 and S4 by executing the output instruction program 43.

The MCU 2 transmits to the port expansion element 3, via the serial communication ports 22, a state demand instruction that demands information of a state of an output signal, and furthermore, receives a response to the state demand instruction from the port expansion element 3 (S5). The MCU 2 executes the processing of step S5 by executing the output state demand program 44.

The MCU 2 compares the state of the plurality of control output signals stored in step S4 with the state of a plurality of control output signals obtained by the processing of step S5, and determines whether they match each other (S6). As described above, the state of the plurality of control output signals stored in step S4 shows the content of the signal output instruction transmitted in step S3.

When it is determined that the content of the signal output instruction of the processing of step S6 matches the state of the actual control output signals that have been received from the port expansion element 3, the MCU 2 shifts the processing to the previously described step S1. Meanwhile, when it is determined that they do not match each other, the MCU 2 shifts the processing to the following step S7.

If the content of the signal output instruction does not match the state of the actual control output signals, the MCU 2 determines whether a predetermined re-transmission completion condition is established, and if it is not established, the MCU 2 shifts the processing to step S3 and again performs the output instruction processing (S7). The re-transmission completion condition is, for example, that re-transmission of the output instruction of the control output signals has been repeated a predetermined number of times. In this case, the re-transmission completion condition is that the processing of steps S3-S7 has been repeated n times (n is a constant of 2 or higher) with respect to one cycle of the processing of steps S1 and S2.

If the re-transmission completion condition is established, the MCU 2 executes predetermined error processing (S8). The MCU 2 executes the processing of steps S6-S8 by executing the output comparison program 45.

The processing on the port expansion element 3 side of the control output processing is explained below. The CPU 33 changes the operation mode of the port expansion element 3 to the normal mode at the time of activation, and the processing of step S9 begins in the normal mode.

First, the CPU 33 regularly checks the serial communication ports 31, and determines whether some type of instruction from the MCU 2 has been received (S9). The CPU 33 shifts the processing to step S10 when an instruction from the MCU 2 has been received, and shifts the processing to step S12 when an instruction has not been received. The CPU 33 executes the processing of step S9 by executing the instruction receiving program 351.

The CPU 33 shifts the operation mode of the port expansion element 3 to the normal mode when an instruction from the MCU 2 has been received (S10). If the operation mode is the normal mode at that time, the CPU 33 maintains the operation mode as the normal mode as-is. The CPU 33 activates the internal oscillation circuit 34 when the operation mode is shifted from the waiting mode to the normal mode. The CPU 33 executes the processing of step S10 by executing the normal mode return program 354.

Additionally, the CPU 33 executes the processing corresponding to the instruction received from the MCU 2 (S1). Specifically, when the signal output instruction is received, the CPU 33 outputs control output signals via the signal output ports 32 according to the instruction. If the state demand instruction is received, the CPU 33 transmits to the MCU 2, via the serial communication ports 31, signal state information showing a state of the control output signals that are being output via the signal output ports 32.

Then, the CPU 33 shifts the processing to the previously described step S9 after executing the processing of step S11. The CPU 33 executes the processing of step S11 by executing the instruction responding program 352.

Meanwhile, if an instruction from the MCU 2 has not been received, the CPU 33 determines whether a state of communication via the serial communication ports 31 satisfies a predetermined suspension condition (S12). Then, when it is determined that the suspension condition is satisfied, the CPU 33 shifts the processing to step S13, and when it is determined that the suspension condition is not satisfied, the CPU 33 shifts the processing to the previously described step S9.

When the suspension condition is established, the CPU 33 shifts the operation mode of the port expansion element 3 from the normal mode to the waiting mode (S13). The CPU 33 suspends the operation of the internal oscillation circuit 34 when the operation mode is shifted from the normal mode to the waiting mode. The CPU 33 executes the processing of steps S12 and S13 by executing the waiting mode shift program 353. An exemplary suspension condition is as described above.

As the CPU 33 executes the processing of steps S10 and S12, the port expansion element 3 automatically switches, depending on whether communication via the serial communication ports 31 is being suspended, between: (i) operation in a waiting mode in which the internal oscillation circuit 34 is suspended, and (ii) operation in a normal mode in which the internal oscillation circuit 34 is operated.

In the ECU 1 for a vehicle, the MCU 2 transmits a signal output instruction to the port expansion element 3 when a control output condition is established that is based on direct input signals that are input via the signal input ports 21 of the MCU 2. Otherwise, the instruction is not transmitted. Because of this, the port expansion element 3 shifts to the waiting mode, in which the internal oscillation circuit 34 is suspended, if a state in which an output condition is not established continues for a certain period of time (S13).

Thus, if the ECU 1 is used, a power-saving function of the port expansion element 3 can be effectively used, power consumption can be reduced, and radio noise generated from the internal oscillation circuit 34 of the port expansion element 3 can be reduced.

Furthermore, in the ECU 1, when a signal output instruction is transmitted, the MCU 2 compares the content of the instruction with the state of the output signals obtained from the port expansion element 3, and if they do not match each other, the instruction of the signal output to the port expansion element 3 is re-transmitted (S4-S7). Because of this, even when a transmission frequency of the signal output instruction decreases, a problem can be avoided in which an error of the signal output continues for a long period of time.

In the ECU 1, omission of the processing of steps S4-S7 by the MCU 2 can also be considered. Furthermore, in the ECU 1, instead of the serial communication ports 22 and 31, use of communication ports that perform communication processing other than serial communication can also be considered.

Various changes, including modifications, omissions, and additions can be made to the embodiment(s) disclosed above, and still fall within the scope of the invention.

What is claimed is:

1. A vehicle electronic controller, comprising:
a microcomputer having a signal input port and a first communication port, the microcomputer configured to provide an instruction; and
a port expansion element having: (i) a second communication port electrically connected to the first communication port of the microcomputer, (ii) a plurality of signal output ports that output signals in response to receipt of the instruction from the microcomputer, and (iii) an internal oscillation circuit,
wherein automatic switching is performed, based on whether communication via the second communication port is being suspended, the automatic switching including switching between a waiting mode in which the internal oscillation circuit is suspended, and a normal mode in which the internal oscillation circuit is operated, and
wherein the microcomputer performs determination processing that determines whether an output condition is established that is based on a direct input signal that is input via the signal input port of the microcomputer, such that: 1) when the output condition is established in the determination processing, output instruction processing is performed, which transmits a signal output instruction to the port expansion element via the first communication port, and 2) when the output condition is not established in the determination processing, the output instruction processing is not performed.

2. The vehicle electronic controller of claim 1, wherein the microcomputer performs: (i) state demand processing that transmits to the port expansion element, via the first communication port, an instruction that requests information of a state of an output signal, and receives a response, and (ii) comparison processing that compares a content of an instruction of a signal output by the output instruction processing with a state of an output signal obtained by the state demand processing, and again performs the output instruction processing when the content of the instruction does not match the state of the output signal in the comparison processing.

3. The vehicle electronic controller of claim 1, wherein the port expansion element includes a CPU and a program memory, the CPU executing instruction receiving processing, instruction responding processing, waiting mode shift processing, and normal mode return processing by executing programs that have been recorded in the program memory in advance.

4. The vehicle electronic controller of claim 1, wherein the internal oscillation circuit is configured to generate a clock signal needed for processing of serial communications in the port expansion element.

* * * * *